358-190. OR 3,560,650 SR

United States Patent [11] 3,560,650

[72] Inventor Judson A. Hofmann
Oak Park, Ill.
[21] Appl. No. 785,683
[22] Filed Dec. 20, 1968
[45] Patented Feb. 2, 1971
[73] Assignee Zenith Radio Corporation
Chicago, Ill.
a corporation of Delaware

[54] CONTROL CIRCUIT

9 Claims, 1 Drawing Fig.

[52] U.S. Cl. 178/7.5
[51] Int. Cl. H04n 3/18
[50] Field of Search 315/200, 31, 22; 178/7.5E

[56] References Cited
UNITED STATES PATENTS
3,427,496 2/1969 Wood 315/22

*Primary Examiner*—Richard Murray
*Assistant Examiner*—B. L. Leibowitz
*Attorneys*—John J. Pederson and Eugene M. Cummings

ABSTRACT: A control circuit for preventing the application of accelerating potential in excess of a predetermined maximum value to the cathode-ray picture tube of a television receiver. Positive polarity pulses amplitude-related to the applied accelerating potential are derived from the receiver horizontal deflection system and impressed across the collector-base junction of a transistor. This junction functions as a diode, and in cooperation with an external base-circuit capacitor peak-rectifies the pulses to develop on the transistor's base a pulse-amplitude dependent control voltage. The emitter of the transistor is connected to the control electrode of a silicon controlled rectifier, which has principal electrodes connected between the screen of the horizontal deflection system output tube and ground. When the control voltage developed on the base exceeds the breakdown voltage of the transistor's emitter-base junction, the control voltage is impressed on the control electrode of the silicon controlled rectifier and causes that device to conduct, substantially reducing the screen current applied to the output tube. This reduces the energy available for powering the receiver's sweep-excited high voltage power supply, and hence prevents further generation of accelerating potential in excess of the predetermined maximum value.

TS117 Rn

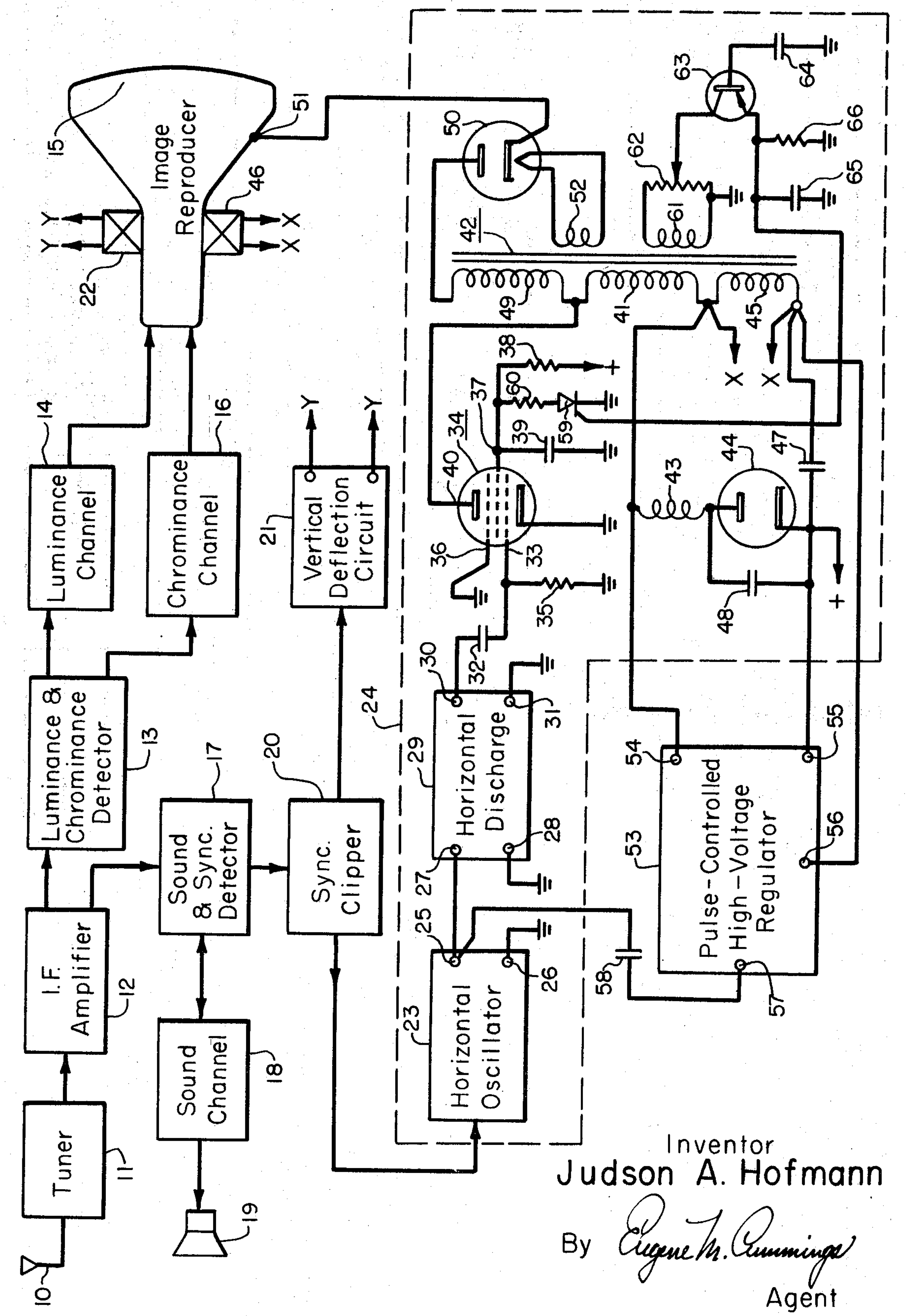
Inventor
Judson A. Hofmann
By Eugene M. Cummings
Agent

CONTROL CIRCUIT

BACKGROUND OF THE INVENTION

The present invention relates to improvements in television receiver control circuits, and more particularly, to a circuit for limiting the high voltage produced by the sweep-excited power supply of a color television receiver.

Cathode-ray tubes of the type commonly used for image reproduction in present-day color television receivers require for their operation an accelerating potential in the order of 25,000 volts. For reasons of economy, it has become standard practice to generate this potential by means of a power supply excited by the output stage of the receiver horizontal deflection system. Unfortunately, such sweep-excited power supplies, while offering economy by obviating the need for expensive transformers and filters, have undesirably poor voltage regulation under the varying load conditions imposed by cathode-ray tubes with brightness level variations in the reproduced image. Accordingly, it has become standard practice to use in conjunction with such power supplies a voltage regulator for maintaining the accelerating potential substantially constant in the face of brightness variations. Such regulators have generally fallen into one of two categories; the shunt-connected type which is connected across the high-voltage output of the power supply to maintain a substantially constant load on this supply at all times, and the pulsed type which is gated into conduction during a portion of the horizontal retrace interval to impose a variable load on a low voltage secondary winding on the flyback transformer.

Unfortunately, the use of either of these two types of regulators is accompanied by the possibility that the regulator will fail and the high voltage produced by the power supply will rise to an abnormally high level, limited only by the capability of the power supply components. Should this happen, there exists the possibility of damage to the power supply components as well as the possibility of the picture tube becoming a shock and radiation hazard.

SUMMARY OF THE INVENTION

Accordingly, it is a general object of the invention to provide an economical control circuit for limiting the accelerating voltage produced by the sweep-excited high-voltage power supply of a television receiver to a predetermined maximum value.

It is another object of the invention to provide an overvoltage detector for monitoring a source of signal to provide an indication when the signal has an amplitude in excess of a predetermined maximum value.

In accordance with one aspect of the invention, a television receiver of the type including an image reproducer requiring an externally applied high-voltage accelerating potential, and a high-voltage power supply for supplying the potential, includes a control circuit for preventing the accelerating potential from exceeding a predetermined maximum value. The control circuit comprises normally ineffective control means actuable by an externally applied voltage to regulate or interrupt the power supply, and a source of pulses amplitude-related to the accelerating potential. Means are included for rectifying the pulses to produce a control voltage representative of the amplitude of the pulses, and threshold means apply the control voltage to the control means to regulate or interrupt the power supply only when the control voltage exceeds a threshold value corresponding to the predetermined maximum value of accelerating potential.

In accordance with another aspect of the invention, an overvoltage detector for monitoring a source of signal to provide an indication when the signal has an amplitude in excess of a predetermined maximum value, comprises a transistor having base, emitter and collector electrodes and collector-base and emitter-base junctions. The detector further comprises a capacitor coupled between the base electrode and ground, and means for applying the signal to the collector-base junction to develop at the base electrode a control voltage representative of the amplitude of the signal. Further included are utilization means responsive to an applied control effect to change its operating condition and provide an indication of such change, and threshold means comprising the emitter-base junction for applying the control voltage to the utilization means only when the control voltage exceeds a level corresponding to the predetermined maximum value.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying DRAWING, which is a detailed diagram, partially in block form and partially in schematic form, of a color television receiver incorporating a high voltage limiting circuit in accordance with the invention.

DESCRIPTION OF THE PREFERRED EMBODIMENT

With the exception of certain detailed circuitry in its horizontal deflection system, the illustrated receiver is essentially conventional in design and accordingly only a brief description of its structure and operation need be given here. A received signal is intercepted by an antenna 10 and coupled in a conventional manner to a tuner 11, which includes the usual radio frequency amplifying and heterodyning stages for translating the signal to an intermediate frequency. After amplification by an intermediate frequency (IF) amplifier 12, the signal is applied to a luminance and chrominance detector 13, wherein luminance and chrominance information in the form of a composite video signal is derived.

The luminance component of the composite signal, representing elemental brightness variations in the televised image, is amplified in a luminance channel 14 and applied to the receiver image reproducer 15, a conventional trigun tricolor cathode-ray tube. The chrominance component of the composite signal, representing elemental color hue and saturation variations, is coupled from detector 13 to a chrominance channel 16, which includes conventional chrominance amplification and demodulation circuitry for driving color control signals representative of the chrominance content of the transmitted image. These signals are applied to image reproducer 15 wherein they matrix with the amplified luminance signal from luminance channel 14 to produce an image having brightness, hue and color saturation characteristics corresponding to those of the transmitted image.

The amplified intermediate-frequency signal from intermediate frequency amplifier 12 is also applied to a sound and sync detector 17, wherein a composite video-frequency signal is derived which includes both sound and synchronizing components. The sound components of this composite signal are applied to sound circuits 18, wherein conventional sound demodulation and amplification circuitry is utilized to develop an audio output signal for application to a speaker 19. The synchronizing components are applied to a sync clipper 20, wherein synchronizing information, in the form of horizontal and vertical sync pulses, is separated for application to the receiver deflection circuits. The vertical sync pulses are applied to a vertical deflection circuit 21, which utilizes the pulses to generate a synchronized vertical-rate sawtooth scanning signal in a vertical deflection winding 22 associated with image reproducer 15. The horizontal sync pulses from sync clipper 20 are applied to a horizontal oscillator 23, which comprises part of the receiver horizontal deflection system 24 and includes appropriate phase-detector and reactance control circuitry for producing at its output terminals 25 and 26 a synchronized horizontal-rate sine-wave output signal.

The oscillator output signal is applied directly to the input terminals 27 and 28 of a horizontal discharge stage 29, terminals 25 and 27 being connected together and terminals 26 and 28 being grounded. Horizontal discharge stage 29 amplifies and conditions this signal to develop a drive signal across its output terminals 30 and 31 which resembles a sawtooth during scan intervals and a steep negative-polarity pulse during retrace intervals. This drive signal is coupled by a capacitor 32 to the control grid 33 of an electron-discharge device, pentode 34. The control grid of pentode 34 is returned to ground by a resistor 35, the cathode and suppressor grid 36 are grounded, and the screen grid 37 is connected to B+ by a resistor 38 and bypassed to ground at signal frequencies by a capacitor 39. The anode 40 is coupled to B+ through a load circuit serially comprising the primary winding 41 of a conventional horizontal flyback transformer 42, an inductor 43 and a damper diode 44.

A sawtooth deflection signal is derived from deflection system 24 by means of a secondary winding 45, across which a horizontal deflection winding 46 associated with image reproducer 15 is connected and across which diode 44 is effectively shunt-connected by inductor 43 and a capacitor 47, which also serves to develop a boosted B+ voltage source for the receiver at its juncture with winding 45. A capacitor 48 is shunt-connected across diode 44 to suppress radio frequency spurious emissions generated therein.

In its general aspects, the operation of horizontal deflection system 24 is well known to the art. The drive signal applied to the control grid of pentode 34 initiates conduction in that device at approximately the middle of each horizontal scanning cycle, causing a linear increase in current in primary winding 41, and hence windings 45 and 46, until a maximum is reached corresponding to the three electron beams of the image reproducer being at the right edge of the raster. At this point the drive signal applied to control grid 33 suddenly becomes negative and drives device 34 sharply into cutoff. The sudden termination of current flow through winding 41 causes the magnetic s field surrounding that winding and windings 45 and 46 to collapse, initiating a harmonic oscillation of approximately 95 kHz. in the equivalent tuned circuit consisting of deflection winding 46, capacitors 47 and 48, and the various stray and fixed capacities and inductances of the deflection circuit.

The current through deflection winding 46 reverses during the first quarter cycle of the induced oscillation and rises to a maximum in the reverse direction at the end of second quarter cycle of oscillation. This rapid reversal of current flow constitutes the flyback or retrace interval during which the scanning beams of image reproducer 15 are rapidly returned from the right edge to the left edge of the raster. The voltage developed across winding 45 as a result of the rapid current reversal is applied to diode 44 through inductor 43 and capacitor 47. During retrace this potential renders the cathode of diode 44 positive with respect to its anode, so that the diode does not conduct and has no damping effect on the oscillation. However, at the end of the first half cycle of oscillation the polarity of the signal applied to diode 44 is reversed and the diode conducts, damping out subsequent oscillations and causing a linearly decaying current in deflection winding 46. This sweeps the electron scanning beams from the left edge to the center of the raster, at which point pentode 34 again becomes conductive to complete the scanning cycle.

The sudden termination of current flow at the beginning of each retrace interval also generates a harmonic oscillation in a high voltage tertiary winding 49 contained on transformer 42. This oscillation is peak-rectified by a high-voltage rectifier 50 which, in conjunction with the internal capacity of image reproducer 15, develops an accelerating potential of approximately 25,000 volts on the ultor electrode 51 of image reproducer 15.

A secondary winding 52 is included on transformer 42 for energizing the heater of high voltage rectifier 50.

The receiver includes a pulse-controlled high-voltage regulator 53, preferably identical to the system claimed and described in the copending application of Stanley Bart, Ser. No. 567,466. now U.S. Pat. No 3,501,589, and assigned to the present assignee, for regulating the accelerating potential applied to image reproducer 15. The regulator has a pair of output terminals 54 and 55 shunt-connected across secondary winding 45 of sweep transformer 42, a control terminal 56 connected to the receiver B+ boost source, the juncture of winding 45 and capacitor 47, and a gating terminal 57 connected by a coupling capacitor 58 to a source of burst-interval gating pulses, output terminal 25 of horizontal oscillator 23.

Basically, the regulator functions by variably loading secondary winding 45 during the first quarter cycle of the induced harmonic oscillation, the effect of which is to vary the peak amplitude of the initial quarter cycle of oscillation in tertiary winding 49, and hence the DC voltage developed by rectifier 50. The degree of loading thus imposed is varied directly with the accelerating potential applied to ultor electrode 51 through the agency of an external control voltage applied to terminal 56, in this case the receiver B+ boost voltage, to establish the necessary feedback loop for voltage regulation. To prevent the width of the reproduced image from varying with regulator-imposed loading variations on winding 45, the horizontal-rate signal generated by horizontal oscillator 23 is applied to the gating control terminal 57 of the regulator to gate that stage on only during the small portion of the first half of the retrace interval during which the initial voltage-determining flyback pulse is present, and not during the scanning portions of the cycle.

For regulator 53 to function it is necessary that the circuitry of horizontal deflection stage 24, and in particular pentode 34 and the turns ratios of the various windings of transformer 42, be engineered to produce an accelerating potential on ultor electrode 51 in excess of the desired nominal value in the absence of loading by regulator 53. In practice, this voltage may be in the order of 28,000 to 34,000 volts, substantially in excess of the 25,000 volt desired maximum value. It will be appreciated that absent additional protection circuitry, any failure of the regulator stage 53, whether it be caused by an open heater, a component failure, or an absence of gating pulses, will result in an overvoltage condition.

In accordance with the invention, the receiver includes a novel voltage-limiting control circuit to prevent such overvoltage conditions. The circuit comprises an overvoltage detector, which monitors the applied accelerating voltage and provides an indication in the form of a control voltage upon the occurrence of an overvoltage condition, and utilization means which respond to the detector generated control voltage by the receiver power supply incapable of sustaining the overvoltage condition. In the illustrated embodiment the utilization means, or control means, comprises a silicon controlled rectifier (SCR) 59 having principal electrodes serially connected by a current limiting resistor 60 from the screen grid 37 of pentode 34 to ground. The overvoltage detector comprises a winding 61 on flyback transformer 42, across which is shunt-connected the body of a potentiometer 62. The arm of this potentiometer is connected to the collector of a PNP transistor 63, the base of which is coupled to ground by a capacitor 64. The emitter of transistor 63 is coupled to ground by the parallel combination of a capacitor 65 and a resistor 66 and to the control electrode of silicon controlled rectifier 59 by direct connection.

In operation, positive-polarity retrace pulses which vary as a function of the load imposed on the high-voltage power supply by image reproducer 15 are developed across winding 61. A portion of these pulses, depending on the position of the arm of potentiometer 61, is applied to the collector-base junction of transistor 63, which functions as a diode and in conjunction with capacitor 64 peak detects the pulses to develop a pulse-amplitude-dependent DC bias on the base of transistor 63, back biasing its base-emitter junction. Under normal operating conditions, the positive pulses developed across winding 61 do not develop sufficient voltage at the base of transistor 63 to cause the breakdown of the base-emitter junction of that device, which functions as a threshold device for the detector. However, when the accelerating voltage rises beyond the established maximum threshold value, as would be the case if regulator 53 were to completely fail, the potentiometer 62 is adjusted so that the DC potential developed from the corresponding pulses on winding 61 will be sufficient to breakdown the emitter-base junction and cause the bias to be applied to the control electrode of SCR 59. This triggers the SCR into conduction, substantially increasing the current drawn through screen dropping resistor 38 and thereby reducing the screen potential on pentode 34 to a point where the output from that tube is no longer sufficient to operate the deflection system and sustain the overvoltage condition.

The value of the series current limiting resistor 60 is sufficient to prevent damage to SCR 59 from excessive current, but small enough so that when SCR 59 is conductive the screen voltage applied to pentode 34 will be reduced to a point where the deflection system can no longer function. To a viewer this condition may be manifested either by no raster, or by severe degradation of the reproduced image in the form of inadequate width, blooming and poor focus; in either case causing the viewer to discontinue operation of the receiver and to summon a serviceman.

Once SCR 59 has been triggered into conduction, it will remain conductive as long as its minimum holding current requirements are met. Thus, for practical SCR devices and practical values of screen dropping resistance, the horizontal deflection system will remain disabled indefinitely following an overvoltage condition, whether continuous or momentary, until B+ current to the screen grid is interrupted, which normally occurs only when the set is turned off. To prevent the SCR from being falsely triggered into conduction by B+ voltage when the receiver is first turned on and the screen grid is not yet drawing current, it is necessary that the breakdown voltage rating between the principal electrodes of the SCR be in excess of the receiver B+ voltage.

The proposed circuit requires only a few additional inexpensive components, and therefore is especially well-suited for mass production in today's highly competitive consumer television market. Furthermore, the circuit is easy to adjust, offers good stability under conditions of varying line voltage and ambient temperature, and can be added to a television chassis with few changes in existing circuitry. It is contemplated that in the majority of cases winding 61 will already exist on the sweep transformer as a convergence winding, obviating the expense of an additional winding and redesign of the existing horizontal deflection circuitry. Furthermore, other forms of utilization means, such as a solid state switch device in the cathode circuit of the horizontal sweep tube, are contemplated for disabling the high voltage power supply. Of course, the control circuit of the invention would also be useful in environments other than television receivers, such as X-ray machines or the like, where it is necessary to limit the output of a high voltage supply to a predetermined maximum value.

The following are a set of component values for the circuit which have been found to provide satisfactory operation in accordance with the invention. It will be appreciated that these values are given by way of example, and that other values may be substituted therefore without departing from the principles of the present invention.

C39—.01 microfarad.
C64—0.1 microfarad.
C65—.01 microfarad.
R38—17,000 ohms.
R60—100 ohms.
R62—5,000 ohms, linear taper.
R66—1,000 ohms, ½ watt.
V34—6LB6.
TR63—Fairchild 2N4248.
B+—390 volts DC.
SCR59—Fairchild 2N3276.

While a particular embodiment of the invention has been shown and described, it will be obvious to those skilled in the art that changes and modifications may be made therein without departing from the invention and its broader aspects, and, therefore, the aim in the appended claims is to cover all such changes and modifications as fall within the true spirit and scope of the invention.

I claim:

1. In a television receiver of the type including an image reproducer requiring an externally applied high-voltage accelerating potential, and a high-voltage power supply comprising a high-voltage pulse transformer and a high-voltage rectifier for supplying said potential, a control circuit for preventing said accelerating potential from exceeding a predetermined maximum value comprising:

low voltage control means actuable by an externally applied voltage to regulate or interrupt said power supply;

means comprising an auxiliary winding of said pulse transformer constituting a source of pulses amplitude-related to said accelerating potential;

means for rectifying said pulses to produce a control voltage representative of the amplitude of said pulses; and threshold means for applying said control voltage to said control means to regulate or interrupt said power supply only when said control voltage exceeds a threshold value corresponding to said predetermined maximum value of accelerating potential.

2. A control circuit as described in claim 1 including a capacitor, and a transistor having base, emitter and collector electrodes and collector-base and emitter-base junctions, wherein said rectifying means comprises said collector-base junction and said capacitor, and said threshold means comprises said emitter-base junction.

3. A control circuit as described in claim 2 wherein said collector electrode is coupled to said source of pulses, said base electrode is coupled to ground by said capacitor, and said emitter electrode is coupled to said control means.

4. A control circuit as described in claim 3 wherein said control means comprises a silicon controlled rectifier having a pair of principal electrodes and a control electrode, and said emitter electrode is coupled to said control electrode.

5. A control circuit as described in claim 4 wherein said receiver further includes a reaction-scanning system having a flyback transformer, wherein said high-voltage power supply is coupled to said system and derives operating power therefrom, and wherein said source of pulses comprises a winding on said flyback transformer.

6. A control circuit as described in claim 5 wherein said control means is coupled to said reaction-scanning system and interrupts or regulates said power supply by at least partially disabling said scanning system.

7. A control circuit as described in claim 6 wherein said scanning system includes an electron-discharge device and said control means functions by at least partially disabling said device.

8. A control circuit as described in claim 7 wherein said electron-discharge device has a screen grid requiring a an externally applied unidirectional current, and said silicon controlled rectifier is coupled between said screen grid and ground to at least partially interrupt the application of current to said screen grid.

9. An overvoltage detector for monitoring a high-voltage power supply to provide an indication when the output voltage of said power supply has an amplitude in excess of a predetermined maximum value, comprising:

a transistor having base, emitter and collector electrodes and collector-base and emitter-base junctions;

a capacitor coupled between said base electrode and ground;

means for applying said signal to said collector-base junction to develop at said base electrode a control voltage representative of the amplitude of said signal;

utilization means responsive to an applied control effect to change its operating condition and provide an indication of such change; and threshold means comprising said emitter-base junction for applying said control voltage to said utilization means only when said control voltage exceeds a level corresponding to said predetermined maximum value.